United States Patent
Mano et al.

(10) Patent No.: US 10,933,462 B2
(45) Date of Patent: Mar. 2, 2021

(54) METHOD FOR FORGING SHAFT MEMBER OF CONSTANT VELOCITY UNIVERSAL JOINT

(71) Applicants: NTN CORPORATION, Osaka (JP); ENOMOTO MACHINE CO., LTD., Kanagawa (JP)

(72) Inventors: Yoshiya Mano, Shizuoka (JP); Shintaro Suzuki, Shizuoka (JP); Shunichirou Tsuboi, Shizuoka (JP); Akira Nagatake, Shizuoka (JP); Renji Natsume, Shizuoka (JP); Masazumi Kobayashi, Shizuoka (JP); Tatsuro Sugiyama, Shizuoka (JP); Yoshio Enomoto, Kanagawa (JP)

(73) Assignee: NTN CORPORATION, Osaka (JP)

(*) Notice: Subject to any disclaimer, the term of this patent is extended or adjusted under 35 U.S.C. 154(b) by 216 days.

(21) Appl. No.: 15/743,827

(22) PCT Filed: Jun. 20, 2016

(86) PCT No.: PCT/JP2016/068240
§ 371 (c)(1),
(2) Date: Jan. 11, 2018

(87) PCT Pub. No.: WO2017/010237
PCT Pub. Date: Jan. 19, 2017

(65) Prior Publication Data
US 2018/0200782 A1    Jul. 19, 2018

(30) Foreign Application Priority Data

Jul. 15, 2015  (JP) .............................. JP2015-141234

(51) Int. Cl.
*B21K 1/06*  (2006.01)
*B21J 5/08*  (2006.01)
(Continued)

(52) U.S. Cl.
CPC .......... *B21K 1/06* (2013.01); *B21J 5/08* (2013.01); *B21J 13/02* (2013.01); *B21J 13/03* (2013.01);
(Continued)

(58) Field of Classification Search
CPC .... B21K 1/06; B21K 1/10; B21K 1/12; B21K 1/14; B21J 5/02; B21J 5/022; B21J 5/025;
(Continued)

(56) References Cited

U.S. PATENT DOCUMENTS

2010/0308612 A1* 12/2010 Antunes ................ C21D 1/02
                                                      295/36.1
2016/0201730 A1    7/2016  Osugi et al.

FOREIGN PATENT DOCUMENTS

JP    63-106543    7/1988
JP    11-347683    12/1999
(Continued)

OTHER PUBLICATIONS

Extended European Search Report dated Feb. 13, 2019 in corresponding European Patent Application No. 16824217.0.
(Continued)

*Primary Examiner* — Debra M Sullivan
*Assistant Examiner* — Matthew Kresse
(74) *Attorney, Agent, or Firm* — Wenderoth, Lind & Ponack, L.L.P.

(57) ABSTRACT

A forging method for a shaft member includes preforming at least one of a plurality of enlarged diameter portions to obtain a semi-finished member, and forming a remainder of the enlarged diameter portions in the semi-finished member using a mold. The mold includes a punch, split dies, and a workpiece receiving member. The forming of the remainder of the enlarged diameter portions includes allowing the semi-finished member having the at least one of the enlarged
(Continued)

diameter portions to be placed on the workpiece receiving member, cramping the semi-finished member in its radial direction by closing the split dies, and filling the semi-finished member into forming surfaces of the split dies by the pressure applied by the punch under the state in which the semi-finished member is cramped.

13 Claims, 14 Drawing Sheets

(51) Int. Cl.
| | |
|---|---|
| *B21J 13/02* | (2006.01) |
| *B21J 13/03* | (2006.01) |
| *B21K 1/76* | (2006.01) |
| *F16D 3/227* | (2006.01) |
| *F16D 1/027* | (2006.01) |
| *B21K 1/14* | (2006.01) |
| *F16D 3/223* | (2011.01) |

(52) U.S. Cl.
CPC ............... *B21K 1/14* (2013.01); *B21K 1/765* (2013.01); *F16D 1/027* (2013.01); *F16D 3/227* (2013.01); *F16D 2003/22326* (2013.01)

(58) Field of Classification Search
CPC ..... B21J 5/08; B21J 13/02; B21J 9/022; B21J 9/06; B21J 9/08; B21J 3/00; B21J 9/00; B21J 9/02; B21J 13/025
See application file for complete search history.

(56) References Cited

FOREIGN PATENT DOCUMENTS

| | | |
|---|---|---|
| JP | 2000-326046 | 11/2000 |
| JP | 2001-030038 | 2/2001 |
| JP | 2002-346683 | 12/2002 |
| JP | 2015-64101 | 4/2015 |

OTHER PUBLICATIONS

International Search Report dated Sep. 6, 2016 in International (PCT) Application No. PCT/JP2016/068240.
International Preliminary Report on Patentability and Written Opinion of the International Searching Authority dated Jan. 16, 2018 in International (PCT) Application No. PCT/JP2016/068240.

* cited by examiner

METHOD FOR FORGING SHAFT MEMBER OF CONSTANT VELOCITY UNIVERSAL JOINT

TECHNICAL FIELD

The present invention relates to a forging method for a shaft member of a constant velocity universal joint.

BACKGROUND ART

Some products, such, as a power transmission, shaft and other shaft-shaped components, have a portion larger in outer diameter (hereinafter, referred to as enlarged diameter portion) than a shaft section thereof. When the enlarged diameter portion is upset by forging, increase in material yield and simplification of a removal processing step are expected. In some products, the shaft section has a plurality of (two or more) enlarged diameter portions. Hitherto, as a forging technology of forming the enlarged diameter portion, there, has been known processing using an upset forging machine (for example Patent Document 1).

PRIOR ART DOCUMENTS

Patent Documents

Patent Document 1: JP 2001-30038 A

SUMMARY OF THE INVENTION

Problems to be Solved by the Invention

When the enlarged diameter portion is processed using the upset forging machine, a billet is gripped by two opposing dies called gripping dies, and pressure is applied to the billet by a punch. In this manner, the enlarged diameter portion is formed. An example of processing a shaft member having two enlarged, diameter portions at both ends of a shaft section of the shaft member using the upset forging machine is illustrated in FIG. 13. First, one of the two enlarged diameter portions is formed by the upset forging machine. A semi-finished member 101 having one enlarged diameter portion 101a is carried to a position between gripping dies 100 as illustrated in FIG. 13a, and then the gripping dies 100 are closed to grip the semi-finished member 101 as illustrated, in FIG. 13b, Under this state, as illustrated in FIG. 13c, a punch 102 applies pressure to the semi-finished member 101. In this manner, the remaining enlarged diameter portion 101b is formed.

A reaction force given at the time of application of pressure to the punch 102 needs to fee generated by a gripping force of the gripping dies 100. As illustrated in FIG. 13d and FIG. 13a in order to grip the billet or the semi-finished member, it is necessary to form a gap δ between the opposing gripping dies 100. FIG. 13e is a cross-sectional view taken along the line B-B of FIG. 13d. When the punch 102 applies pressure, the gap δ between the opposing gripping dies 100 causes a material to Sow into the gap δ so that a projecting portion 101c is left on an outer diameter of a product. Accordingly, it may be necessary to perform removal of the projecting portion, on some products in a post-processing step. Further, the gripped semi-finished member 101 may be shifted in a direction of applying pressure by the punch 102 during formation. For this reason, entire length dimensions of the products are not stabilized so that it is necessary to set large machining allowance in some products. In addition, the upset forging machine is a dedicated machine having a complex mechanism, and hence is expensive in cost of equipment. With focus on those problems, various studies have been made.

The present invention has been proposed in view of the above mentioned problems, and has an object to provide a forging method for a shaft member of a constant velocity universal joint, which is capable of Increasing yield and accuracy of the shaft member comprising a plurality of enlarged diameter portions in a shaft section thereof, and capable of reducing manufacturing cost of the shaft member.

Solution to the Problems

The investors of the present invention have made various studies in order to achieve the above-mentioned object, and has achieved the present invention after having been conceived of a new idea of enabling application of a genera-purpose machine that is configured to cramp a semi-finished member, which has some of a plurality of enlarged diameter portions formed therein and is to be finished into a shaft member of a constant velocity universal joint, with use of split dies for accommodating the semi-finished member, and to receive pressure applied by a punch with use of a workplace receiving member.

As a technical measure to achieve the above-mentioned object, according to one embodiment of the present invention, there is provided a forging method for a shaft member of a constant velocity universal joint comprising a plurality of enlarged diameter portions on a shaft, section of the shaft member, the method comprising: preforming at least one of the plurality of enlarged diameter portions to obtain a semi-finished member: and forming a remainder of the enlarged diameter portions in the semi-finished member using a mold, the mold comprising: a punch; split dies, which are configured to accommodate the at least one of the enlarged diameter portions and the shaft section of the semi-finished member therein, and each comprise a forming surface; and a workpiece receiving member, which is configured to allow the at least one of the enlarged diameter portions of the semi-finished member to be placed thereon, and receive pressure applied by the punch, the forming a remainder of the enlarged diameter portions comprising: allowing the semi-finis bed member having the at least one of the enlarged diameter portions to be placed on the workpiece receiving member; cramping the semi-finished member in a radial direction of the semi-finished member by closing the split dies; and filling the semi-finished member into the forming surfaces of the split dies by the pressure applied by the punch under the state in which the semi-finished member is cramped. With the above-mentioned configuration, there can be achieved the forging method for a shaft member of a constant velocity universal joint, which is capable of increasing yield and accuracy of the shaft member comprising the plurality of enlarged diameter portions in the shaft section thereof, and capable of reducing manufacturing cost of the shaft member. Further, the shaft member can be formed using equipment equivalent to a press, and hence inexpensive equipment can be selected.

It is desired that the mold further comprise a dosing ring configured to apply a force of closing the above-mentioned split dies, and that pressure be applied to the closing ring by a closing-ring pressure mechanism. With this configuration, mating surfaces of the split dies are brought into close contact with each other so that a minute linear gap is formed in a joining portion between the forming surfaces. Therefore, a material can be prevented from flowing into the gap during formation, and merely a minute linear impression may be formed when the remainder of the enlarged diameter portions is formed. Accordingly, burr removal processing to be performed as a post-processing step can be eliminated or reduced.

The above-mentioned punch comprises a forming surface. Accordingly, end-portion-side shapes of the enlarged diameter portions can be formed easily with high accuracy.

It is desired that, when the above-mentioned remainder of the enlarged diameter portions is forged, a retreat amount of the workpiece receiving member be regulated by a stopper. With this configuration, a positional dimension of the workpiece receiving member is secured by the equipment or a mold dimension. Therefore, an entire length dimension of the semi-finished member subjected to forging is stabilized. Thus, a machining allowance for post-processing can be reduced.

In the above-mentioned forging method for a shaft member of a constant velocity universal joint, the semi-finished member is heated to 800° C. to 1,000° C. In this manner, a normalizing step or a shot peening step that is performed after forging can be omitted. As a result, productivity of a shaft member of a constant velocity universal joint can be increased, and manufacturing cost can be reduced.

Merely the above-mentioned minute linear impression is formed in the remainder of the enlarged diameter portions. Accordingly, burr removal processing to foe performed as a post-processing step can be eliminated or reduced.

The above-mentioned forging method for a shaft member of a constant velocity universal joint is preferably applied to forming of a shaft member of a constant velocity universal joint comprising enlarged diameter portions at both ends of a shaft section.

The above-mentioned forging method for a shaft member of a constant velocity universal joint is preferably applied to forming of a long stem member of an outer joint member of a constant velocity universal joint.

Effects of the Invention

With the forging method for a shaft member of a constant velocity universal joint according to the present invention, it is possible to achieve the forging method for a shaft member of a constant velocity universal joint, which is capable of increasing yield and accuracy of the shaft member comprising the plurality of enlarged diameter portion in the shaft section thereof, and capable of reducing manufacturing cost of the shaft member. Further, the shaft member can be formed using equipment equivalent to a press, and hence inexpensive equipment can be selected.

EMBODIMENTS OF THE INVENTION

Now, description is made of an embodiment of the present invention with reference to the drawings.

FIG. 8 to FIG. 12 are illustrations of a forging method for a shaft member of a constant, velocity universal joint according to one embodiment of the present invention. FIG. 1 to FIG. 5 are illustrations of an example representing application of the shaft member, which is manufactured by the forging method, to an outer joint member of a constant velocity universal joint. First, with reference to FIG. 1 to FIG. 5, description is made of the example representing application of the shaft member, which is manufactured by the forging method, to an outer joint member of a constant velocity universal joint. Subsequently, with reference to FIG. 6 to FIG. 12, description is made of the forging method for a shaft member of a constant velocity universal joint according to this embodiment.

Figure 1:
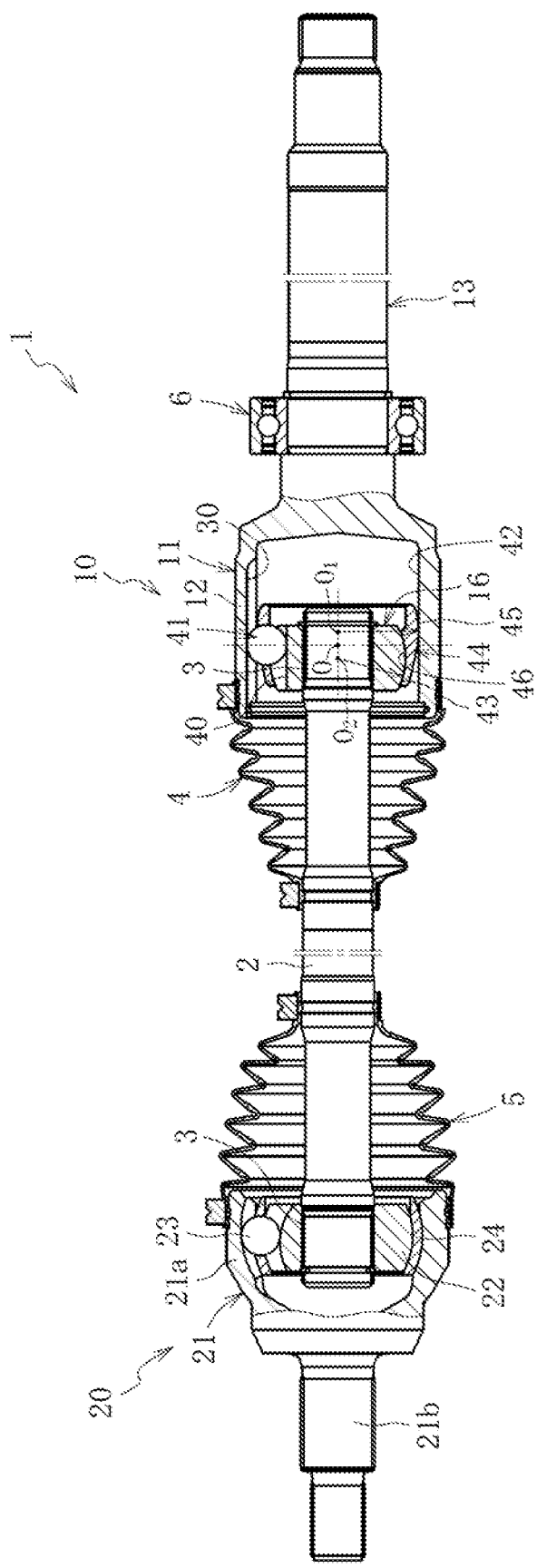
FIG. 1 is a view for illustrating an entire configuration of a drive shaft in which a shaft member manufactured by a forging method according to the present invention is applied to an outer joint member of a constant velocity universal joint.

FIG. 1 is an illustration of an application example of the shaft member manufactured by the forging method for a shaft member of a constant velocity universal joint according to one embodiment of the present invention, and is also a view for illustrating an entire configuration of a drive shaft 1 using an outer joint member to which the shaft member is applied. The drive shaft 1 mainly comprises a plunging type constant velocity universal joint 10 arranged on a differential side (right side of FIG. 1: hereinafter also referred to as "inboard side"), a fixed type constant velocity universal joint 20 arranged on a driving wheel side (left side of FIG. 1: hereinafter also referred to as "outboard side"), and an intermediate shaft 2 configured to couple both the constant velocity universal joints 10 and 20 to allow torque transmission, therebetween.

The plunging type constant velocity universal joint 10 illustrated in FIG. 1 is a so-called double-offset type constant velocity universal, joint (DOJ). The constant velocity universal joint 10 comprises an outer joint member 11 comprising a cup section 12 and a long shaft section (hereinafter referred to also as "long stem section") 13 that extends from a bottom portion of the cup section 12 in an axial direction, an inner joint member 16 housed along an inner periphery of the cup section 12 of the outer joint member 11, balls 41 serving as torque transmitting elements that are arranged between track grooves 30 and 40 of the outer joint member 11 and the inner joint member 16, and a cage 44 having a spherical outer peripheral surface 45 and a spherical inner peripheral surface 46 that are fitted to a cylindrical inner peripheral surface 42 of the outer joint member 11 and a spherical outer peripheral surface 43 of the inner joint member 16, respectively, and being configured to retain the balls 41. A curvature center $O_1$ of the spherical outer peripheral surface 46 and a curvature center $O_2$ of the spherical inner peripheral surface 46 of the cage 44 are offset equidistantly from a joint center O toward opposite sides in the axial direction.

An inner ring of a support bearing 6 is fixed to an outer peripheral surface of the long stem section 13, and an outer ring of the support bearing 6 is fixed to a transmission ease with a bracket (not shown). The outer joint member 11 is supported by the support bearing 6 in a freely rotatable manner, and when the support bearing 6 as described above is provided, vibration of the outer joint member 11 during driving or the like is prevented as much as possible.

The fixed type constant, velocity universal joint 20 illustrated in FIG. 1 is a so-called Rzeppa type constant velocity universal joint, and comprises an outer joint member 21 comprising a bottomed cylindrical cup section 21a and a shaft section 21b that extends from a bottom portion of the cup section 21a in the axial direction, an inner joint member 22 housed along an inner periphery of the cup section 21a of the outer joint member 21, balls 23 serving as torque transmitting elements that are arranged between the cup section 21a of the outer joint member 21 and the inner joint member 22, and a cage 24, which is arranged between an inner peripheral surface of the cup section 21a of the outer joint member 21 and an outer peripheral surface of the inner joint member 22, and is configured to retain the balls 23. As the fixed type constant velocity universal joint 20, an undercut-free type constant velocity universal joint may sometimes be used.

The intermediate shaft 2 comprises splines 3 for torque transmission (including serrations; the same applies hereinafter) at outer diameters on both end portions thereof. The spline 3 on the inboard side is spline-fitted to a hole portion of the inner joint member 16 of the plunging type constant velocity universal joint 10. Thus, the intermediate shaft 2 and the inner joint member 16 of the plunging type constant velocity universal joint 10 are coupled to each other to allow torque transmission therebetween. Further, the spline 3 on the outboard, side is spline-fitted to a hole portion of the inner joint member 22 of the fixed type constant velocity universal joint 20. Thus, the intermediate shaft 2 and the inner joint member 22 of the fixed type constant velocity universal joint 20 are coupled to each other to allow torque transmission therebetween. Although the solid intermediate shaft 2 is illustrated, a hollow intermediate shaft may be used instead.

Grease is sealed inside both the constant velocity universal joints 10 and 20 as a lubricant. To prevent leakage of the grease to an outside of the joint or entry of a foreign matter from the outside of the joint, bellows boots 4 and 5 are respectively mounted to a portion between the outer joint member 11 of the plunging type constant velocity universal joint 10 and the intermediate shaft 2 and a portion between the outer joint member 21 of the fixed type constant velocity universal joint 20 and the intermediate shaft 2.

Figure 2B:
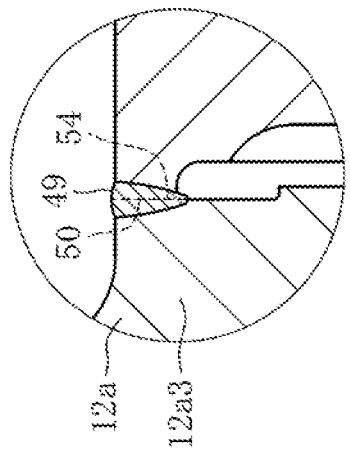
FIG. 2b is an enlarged view for illustrating a welded portion.
Figure 2A:
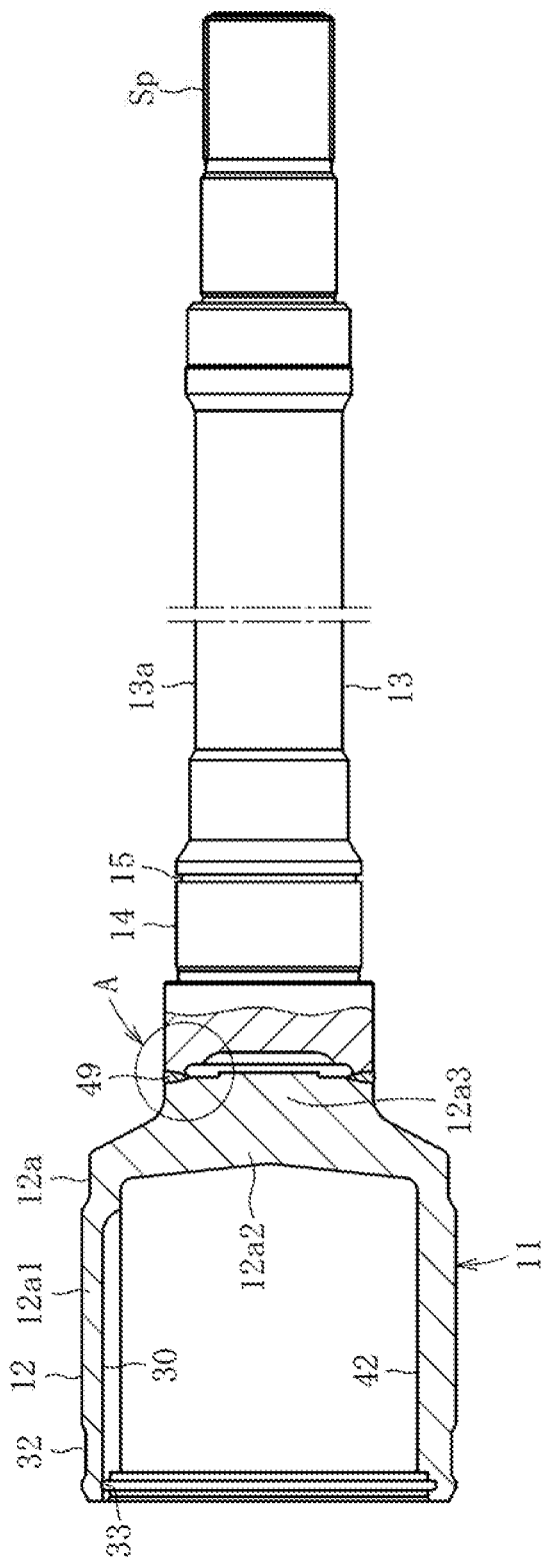
FIG. 2a is an enlarged partial vertical sectional view for illustrating the outer joint member of FIG. 1.

The outer joint member to which the shaft member is applied is described with reference to FIG. 2. FIG. 2 are enlarged illustrations of the outer joint member 11. Specifically FIG. 2a is a partial vertical sectional view, and FIG. 2b is an enlarged view for illustrating the portion A of FIG. 2a. The outer joint member 11 comprises the bottomed cylindrical cup section 12 that is opened at one end and has the cylindrical inner peripheral surface 42 and the plurality of track grooves 30, on which the balls 41 (see FIG. 1) are caused to roll, formed equiangularly on the inner peripheral surface, and the long stem section 13 that extends from the bottom portion of the cup section 12 in the axial direction and comprises a spline Sp serving as a torque transmitting coupling portion formed at an outer periphery on an end portion thereof on an opposite side to the cup section 12. The outer joint member 11 is formed by welding a cup member 12a and a shaft member 13a to each other.

Figure 3:
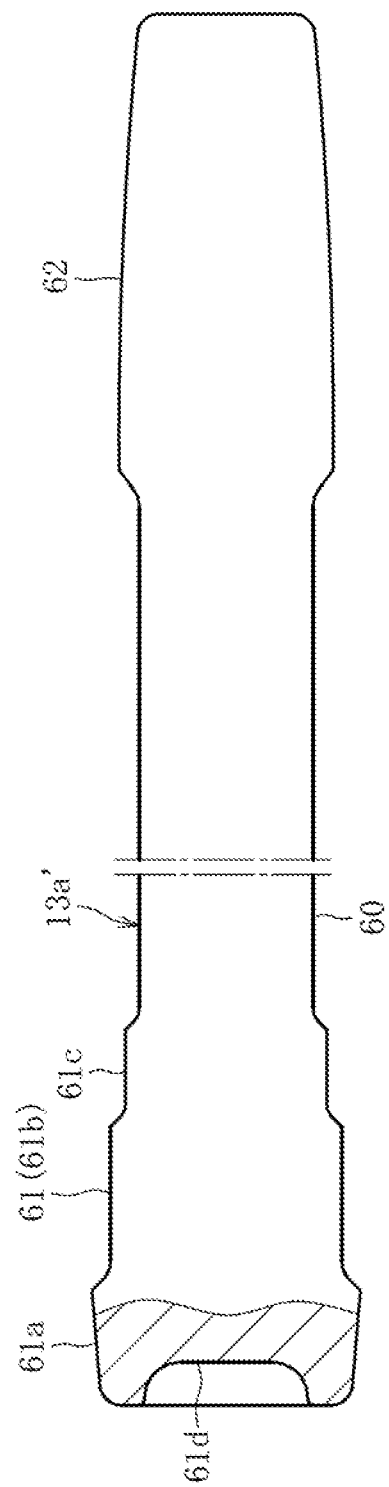
FIG. 3 is a vertical sectional view for illustrating a shape of the shaft member of FIG. 2a after forging.

The shaft member 13a is obtained by performing turning or spline processing, and post processing such as grinding, on the shaft member manufactured by the forging method for a shaft member of a constant velocity universal joint according to one embodiment of the present invention. As illustrated in FIG. 3, a semi-finished member 13a', which is subjected to forging before being processed into the shaft member 13a, comprises enlarged, diameter portions 61 and 62 formed at both ends of a shaft section 60, respectively. A recessed portion 61d is formed in an end portion of the enlarged diameter portion 61. An outer diameter of the shaft section 60 is equal to an outer diameter of a billet (not shown) cut out from a bar material. The semi-finished member 13a' is made of medium carbon steel containing 0.30 wt % to 0.55 wt % of carbon, such as S40C. As described above, turning or spline processing, and post processing such as grinding are performed on the semi-finished member 13a'.

Figure 4:
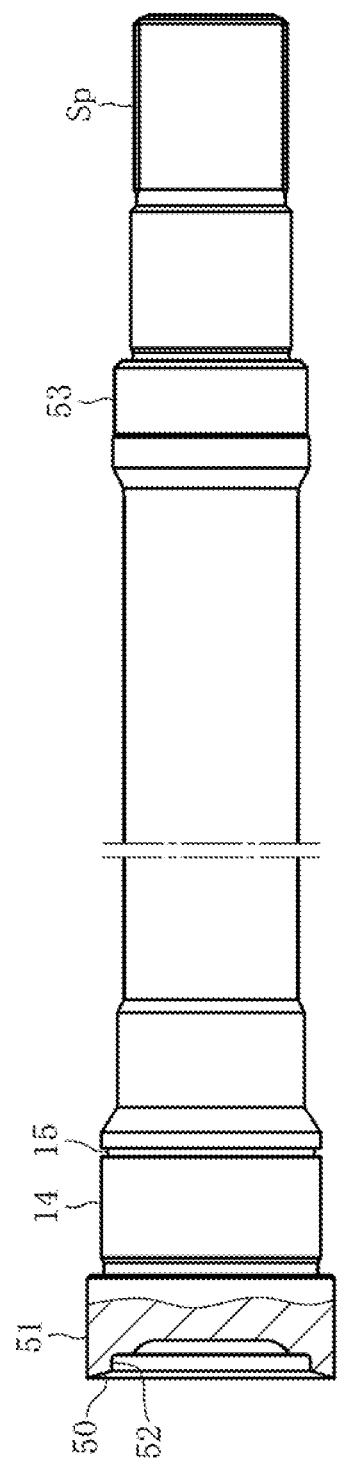
FIG. 4 is a front view for illustrating a shape of the shaft member of FIG. 2a before welding.

In the shaft member 13a obtained by performing post-processing on the semi-finished member 13a', as illustrated in FIG. 4, a joining end surface 50, a joining-portion radially outer surface 51, and a joining-portion radially inner surface 52 are formed in a large diameter portion 61a (see FIG. 3) of the enlarged diameter portion 61, and a bearing mounting surface 14 and a snap ring groove 15 are formed in a middle diameter portion 61b of the enlarged diameter portion 61.

Meanwhile, the spline Sp and a sealing surface 53 are formed in the enlarged diameter portion 62.

Figure 5A:
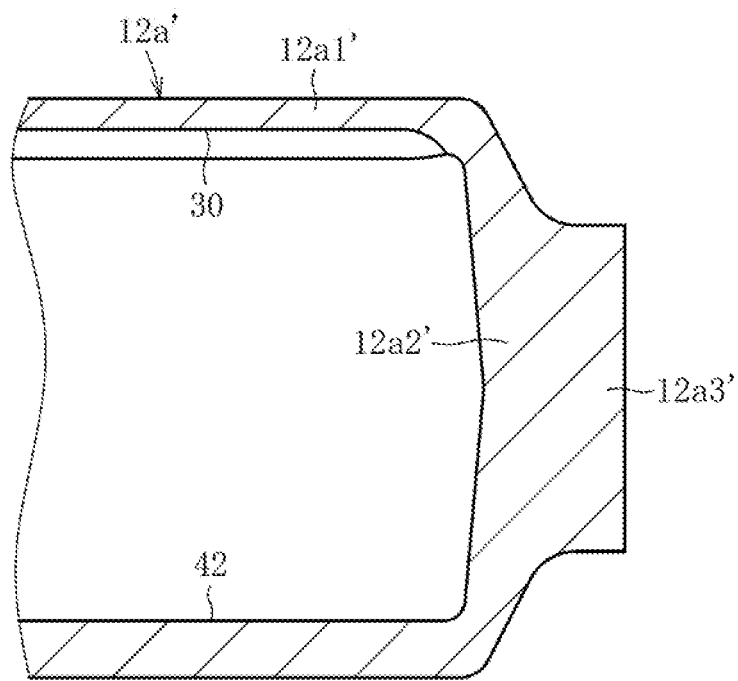
FIG. 5a is an illustration of a shape of a cup member of FIG. 2a before welding, and is a vertical sectional view for illustrating the cup member after ironing.
Figure 5B:
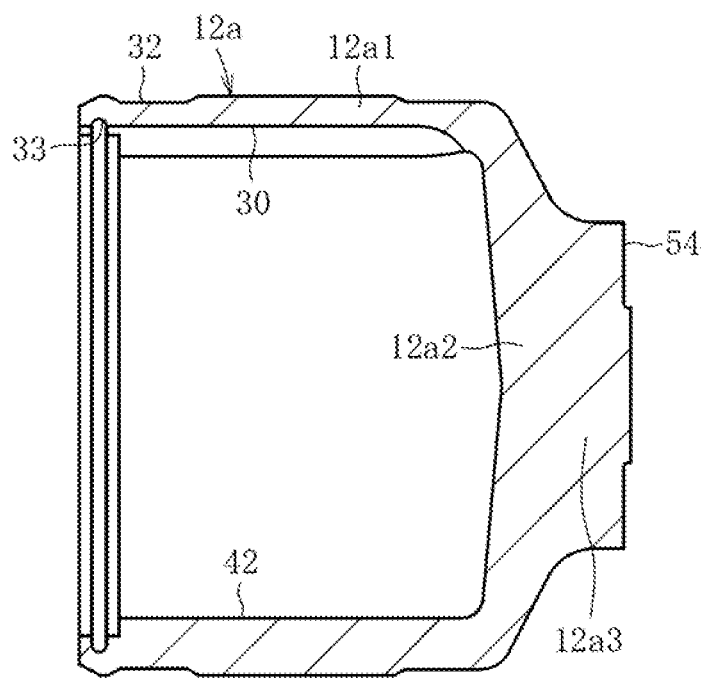
FIG. 5b is an illustration of a shape of the cup member of FIG. 2a before welding, and is a vertical sectional view for illustrating the cup member after turning.

FIG. 5a and FIG. 5b are illustrations of the cup member 12a and a semi-finished member 12a' to be finished into the cup member 12a. The cup member 12a is made of medium carbon steel containing 0.40 wt % to 0.60 wt % of carbon, such as S53C. FIG. 5a is an illustration of the semi-finis bed member 12a' subjected to ironing before being finished into the cup member 12a. The semi-finished member 12a' is an integrally formed product comprising a bottom portion 12a2' and a tubular portion 12a1' having the track grooves 30 and a tubular inner peripheral surface 42 formed in an inner periphery thereof. The track grooves 30 and the tubular inner peripheral surface 42 are finished by ironing. A projecting portion 12a3' is formed on the bottom portion 12a2' of the semi-finished member 12a'. FIG. 5b is an illustration of the cup member 12a subjected to turning. A boot mounting groove 32 is formed in an outer periphery of the cup member 12a on an opening side thereof, and a snap ring groove 33 is formed in an inner periphery of the cup member 12a. A joining end surface 54 is formed on the bottom portion 12a2 (projecting portion 12a3) of the cup member 12a by forming an outer diameter portion of the bottom portion 12a2 into an annularly sunk shape by turning. Thus, a radially center portion of the bottom portion 12a2 is left as a forged surface. In this manner, a time period for performing turning is reduced.

As illustrated in FIG. 2a and FIG. 2b, the shaft member 13a and the cup member 12a are welded to each other by bringing the joining end surface 54 formed at the projecting portion 12a3 of the bottom portion 12a2 of the cup member 12a and the joining end surface 50 formed at an end portion of the shaft member 13a on the cup member 12a side into abutment against each other by electron beam welding performed from an outer side in a radial direction. A welded portion 40 is formed of a head, which is formed by a beam radiated from a radially outer side.

As illustrated in FIG. 2a, the welded portion 49 is formed on the joining end surface 50 located on the cup member 12a side with respect to the bearing mounting surface 14 of the shaft member 13a, and hence the bearing mounting surface 14 and the like can be processed in advance so that post-processing after welding can be omitted. Further, due to the electron beam welding, burrs are not generated at the welded portion. Thus, post-processing for the welded portion can also be omitted, which can reduce manufacturing cost. Still further, total inspection on the welded portion through ultrasonic flaw detection can be performed.

In the above, description is made of the example of applying the shaft member, which is manufactured by the forging method for a shaft member of a constant velocity universal joint according to one embodiment of the present invention, to the long stem section of the outer joint member of the constant velocity universal joint, but application of the shaft member is not limited thereto. The shaft member is also applicable to an intermediate shaft of a drive shaft comprising a plurality of enlarged diameter portions, a power transmission shaft, and other products having a shaft-like shape.

Figure 8:
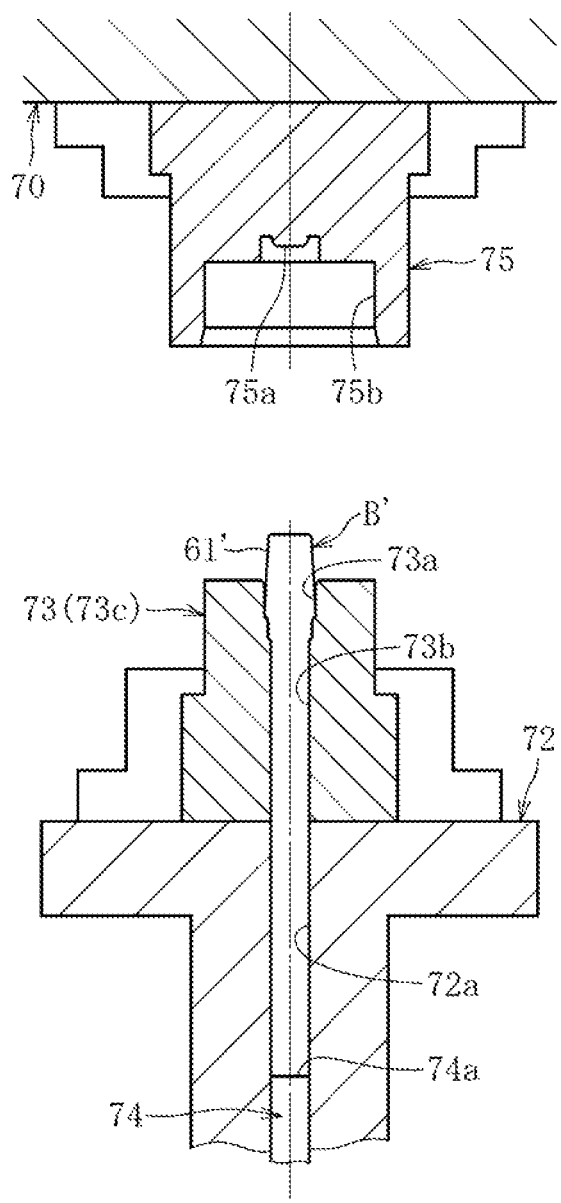
FIG. 8 is a schematic view for illustrating a second step of the primary forging step in the forging method for a shaft member of a constant velocity universal joint according to one embodiment of the present invention.
Figure 9:
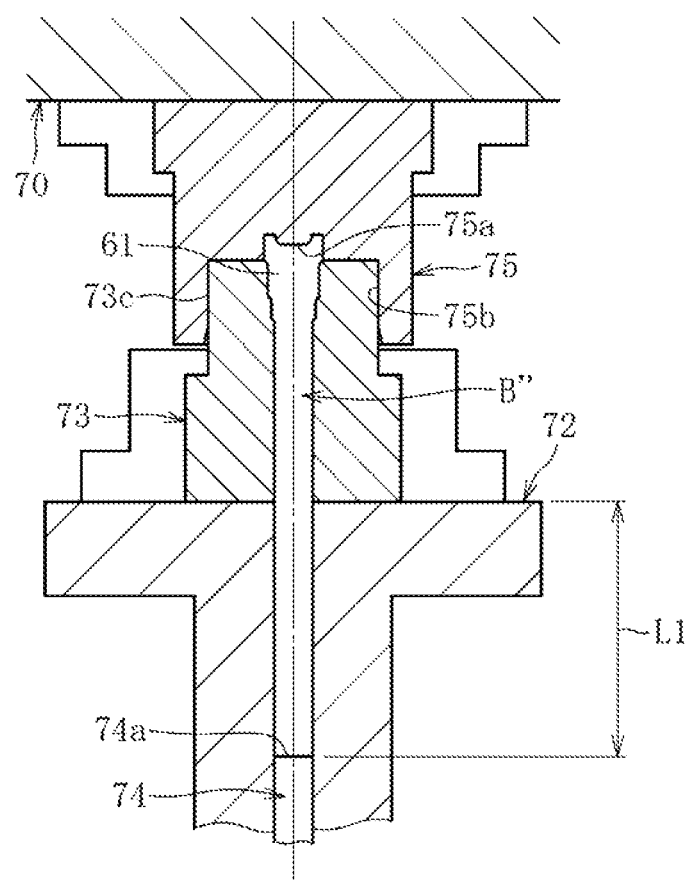
FIG. 9 is a schematic view for illustrating the second step of the primary forging step in the forging method for a shaft member of a constant velocity universal joint according to one embodiment of the present invention.
Figure 10:
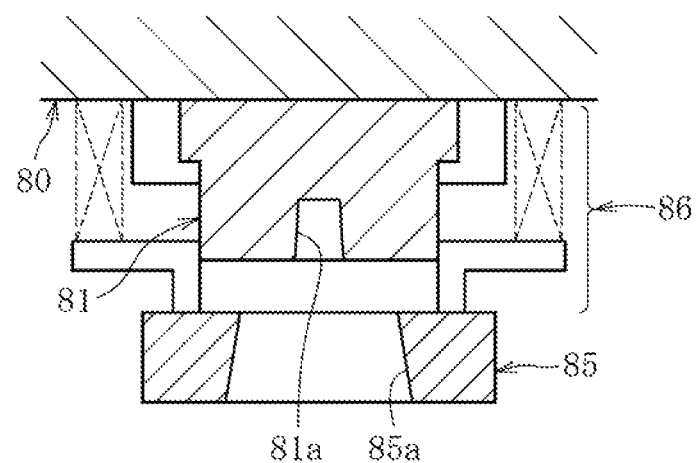
FIG. 10 is a schematic view for illustrating a secondary forging step in the forging method for a shaft member of a constant velocity universal joint according to one embodiment of the present invention.
Figure 10:
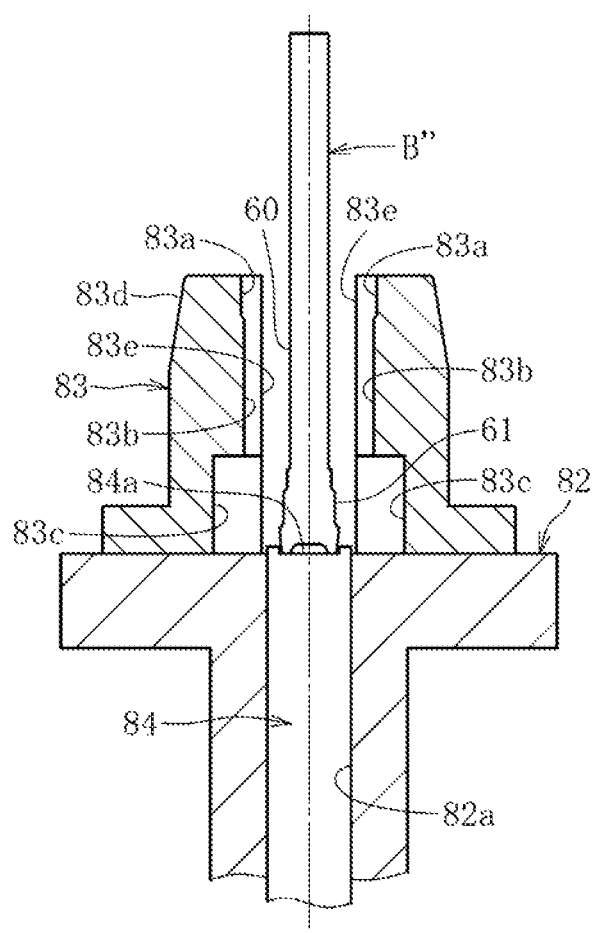
Figure 11:
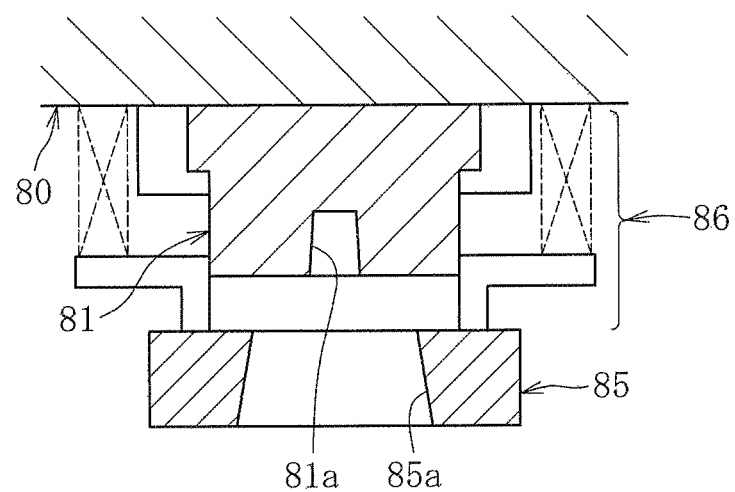
FIG. 11 is a schematic view for illustrating the secondary forging step in the forging method for a shaft member of a constant velocity universal joint according to one embodiment of the present invention.
Figure 11:
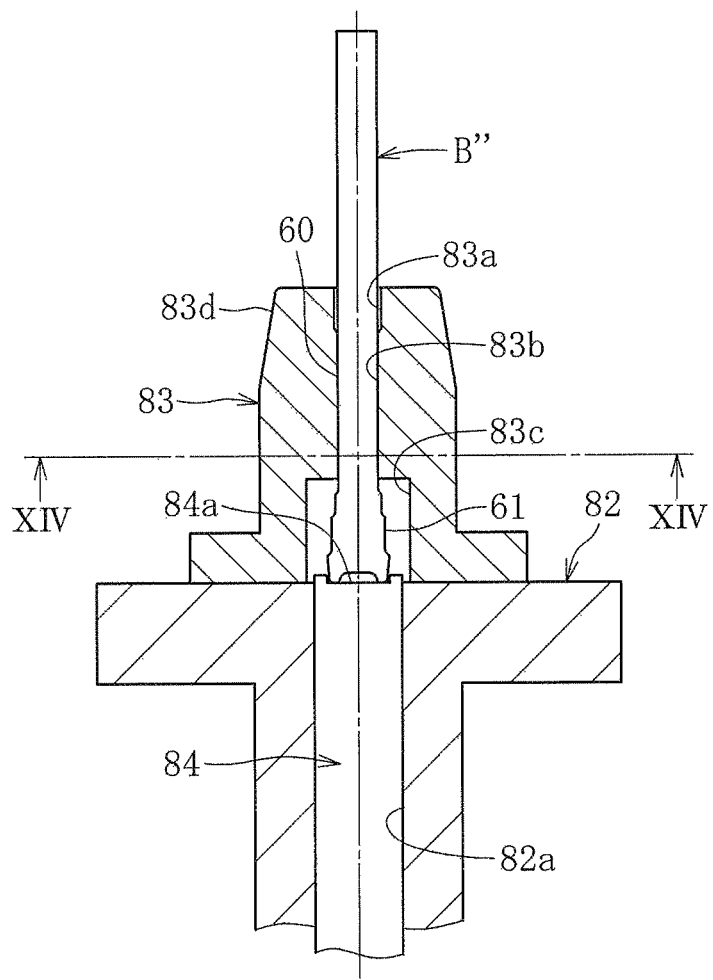
Figure 12:
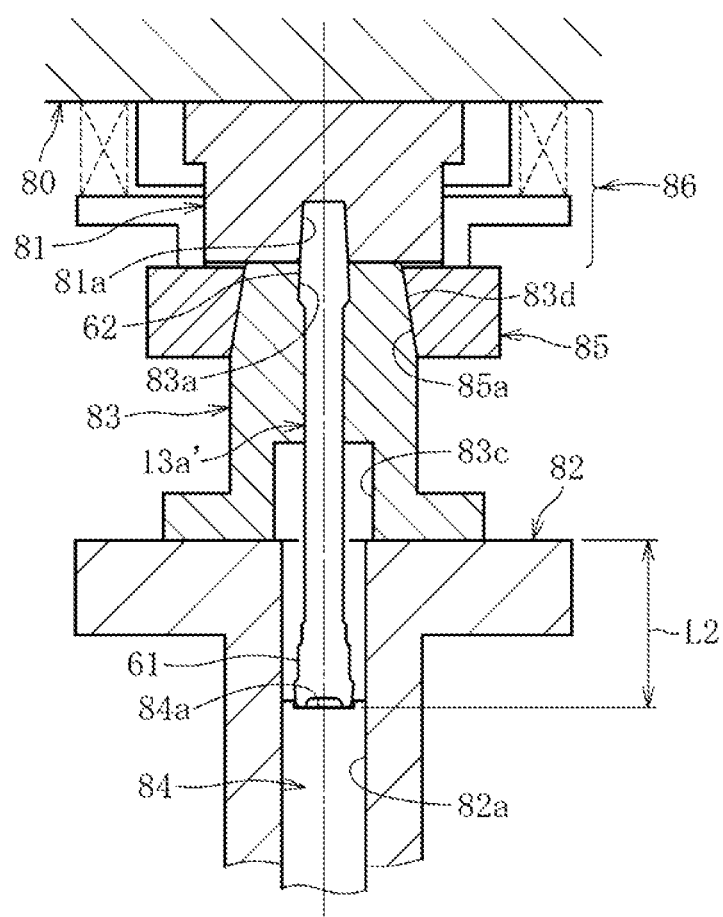
FIG. 12 is a schematic view for illustrating the secondary forging step in the forging method for a shaft member of a constant velocity universal joint according to one embodiment of the present invention.
Figures 13A, 13B, 13C:
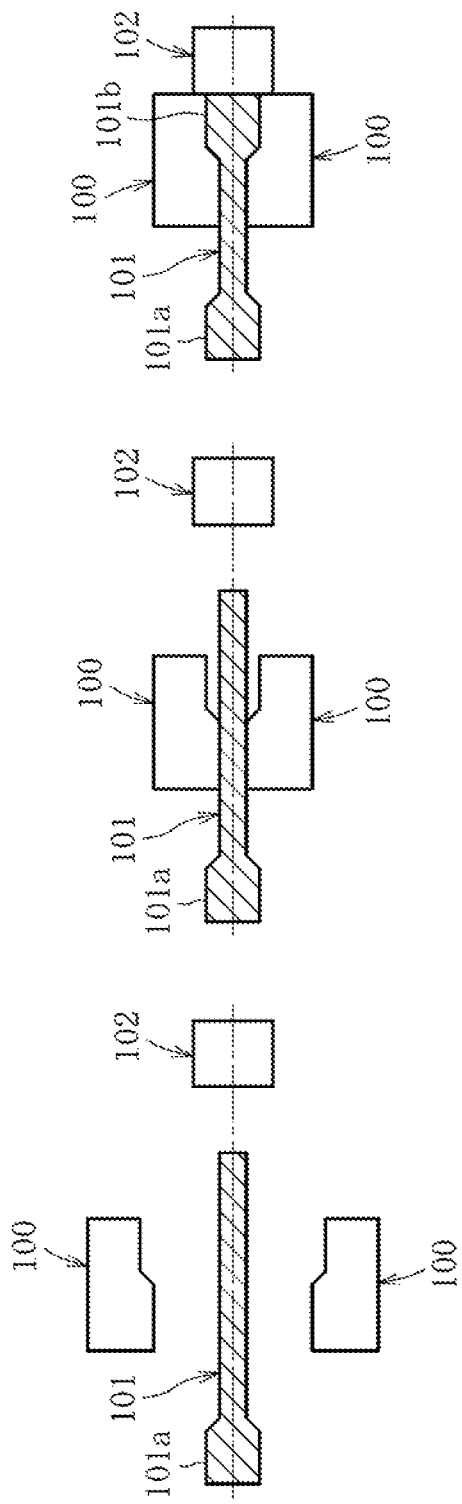
FIG. 13a is a schematic view for illustrating a state before gripping dies grip a semi-finished member in a related-art forging method for a shaft member.
FIG. 13b is a schematic view for illustrating a state in which the gripping dies grip the semi-finished member in the related-art forging method for a shaft member.
FIG. 13c is a schematic view for illustrating a state in which a punch applies pressure in the related-art forging method for a shaft member.
Figure 13D:
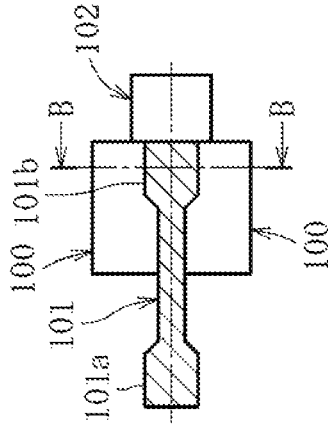
FIG. 13d is a schematic view for illustrating the state in which the punch applies pressure in the related-art forging method for a shaft member.
Figure 13E:
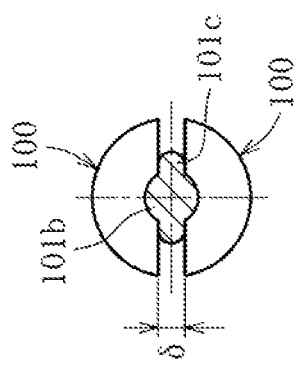
FIG. 13e is a cross-sectional view taken along the line B-B of FIG. 13d.

Next, with reference to FIG. 6 to FIG. 12, description is made of the forging method for a shaft member of a constant velocity universal joint according to one embodiment of the present invention. In the forging method for a shaft member of a constant velocity universal joint according to this embodiment, at least one of a plurality of enlarged diameter portions is preformed to obtain a semi-finished member, and then a remainder of the plurality of enlarged diameter portions is formed in the semi-finished member. FIG. 6 to FIG. 9 are illustrations of a primary forging step of preforming the at least one of the plurality of enlarged diameter portions, and FIG. 10 to FIG. 12 are illustrations of a secondary forging step of forming the remainder of the plurality of enlarged diameter portions.

Figure 6:
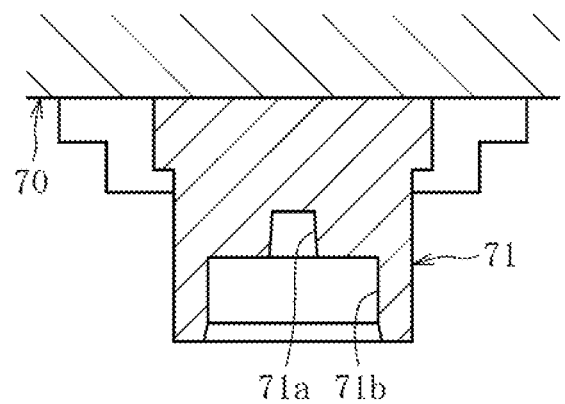
FIG. 6 is a schematic view for illustrating a first step of a primary forging step in a forging method for a shaft member of a constant velocity universal joint according to one embodiment of the present invention.
Figure 6:
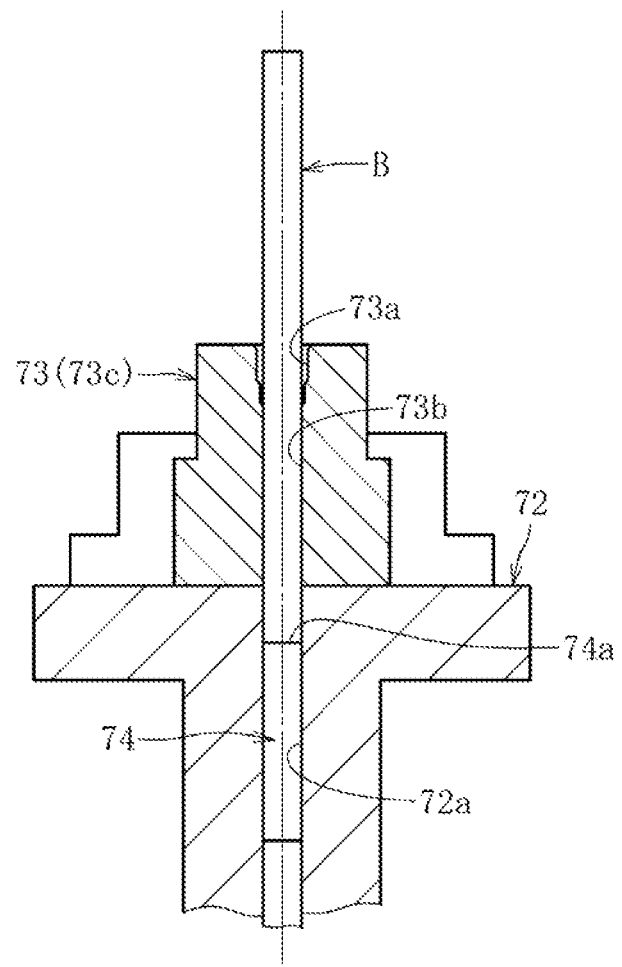

The primary forging step comprises a first step and a second step. As illustrated in FIG. 6, a main mold for use in the first step comprises an upper base 70, a punch 71, a lower base 72, a die 73, and a knockout pin 74. As pressing equipment, a general-purpose screw press being a mechanical press is applied by way of example. However, the present invention is not limited thereto. It is only necessary that the mold can be operated to form an enlarged diameter portion using general-purpose pressing equipment or equipment capable of operating equivalently to the general-purpose pressing equipment. A mechanical press such as a connecting rod press, or a non-mechanical press such as a hydraulic press may be used.

A forming surface 71a having a tapered shape is formed in the punch 71, and the punch 71 is mounted and fixed to the upper base 70 that is not moved in an up-and-down direction. In the die 73, there are formed a forming surface 73a having a stepped cylindrical shape, and a radially inner hole 73b configured to accommodate a billet B therein and to cramp the billet B in a radial direction. The die 73 is mounted and fixed to the lower base 72 that is driven in the up-and-down direction. A guide hole 72a is formed in the lower base 72, and the knockout pin 74 serving as a workpiece receiving member is fitted and inserted in the guide hole 72a so as to be freely slidable.

Figure 7:
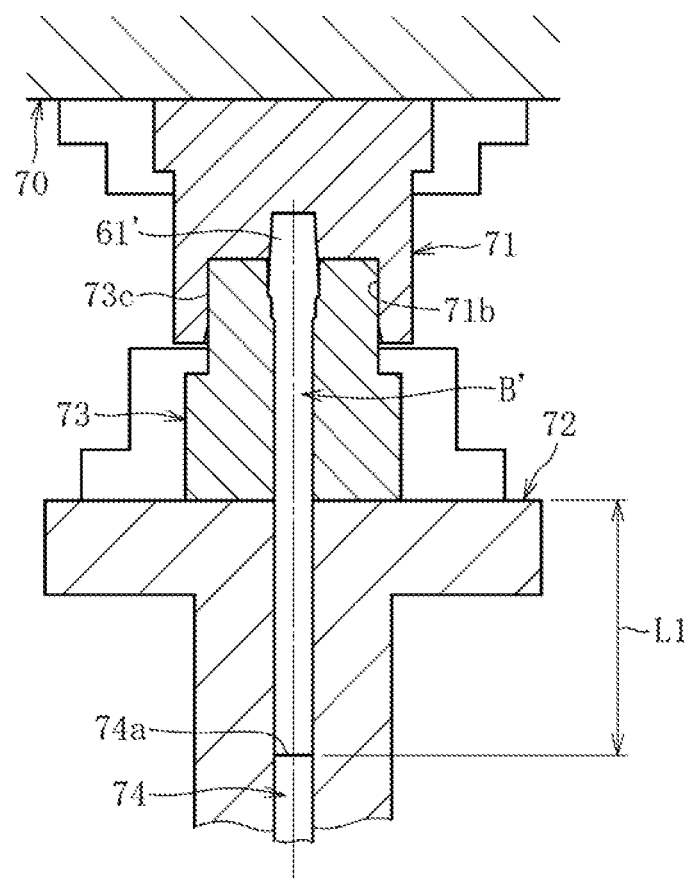
FIG. 7 is a schematic view for illustrating the first step of the primary forging step in the forging method for a shaft member of a constant velocity universal joint according to one embodiment of the present invention.

A downward retreat amount of the knockout pin 74 in the lower base 72 is regulated by a stopper (not shown). As illustrated in FIG. 7 and FIG. 9, a positional dimension L1 of a workpiece receiving surface 74a of the knockout pin 74 when the lower base 72 advances upward to reach a forward end is secured by the equipment or a mold dimension. Therefore, an entire length dimension of the semi-finished member subjected to forging is stabilized. Thus, a machining allowance for post-processing can be reduced.

Action of the first step of the primary forging step is described with reference to FIG. 6 and FIG. 7. First, a part of the billet B to be formed is heated to approximately 800° C. to 1,000° C. In this manner, a normalizing step or a shot peening step that is performed, after forging can be omitted. As a result, productivity of the shaft member can be increased, and manufacturing cost can be reduced. As illustrated in FIG. 6, under a state in which the lower base 72 retreats downward, the heated billet B is carried into the radially inner hole 73b of the die 73 by a loader (not shown), and then is placed on the workpiece receiving surface 74a of the knockout pin 74 being the workpiece receiving member. A gap between the outer diameter of the billet B and the radially inner hole 73b of the die 73 is extremely small. Accordingly, the billet B can be cramped in the radial direction with high accuracy.

Subsequently, the lower base 72 is driven to advance upward. Then, a guide portion 73c of the die 73 is fitted and inserted into a guide portion 71b of the punch 71, and the billet B receives pressure applied by the punch 71 under a state in which the punch 71 and the die 73 are aligned with each other. When the lower base 72 further advances, the knockout pin 74 retreats downward clue to the pressure applied by the punch 71. However, as described above, the downward retreat amount of the knockout pin 74 in the lower base 72 is regulated by the stopper (not shown). Accordingly, the billet B fills a cavity defined by the forming surface 71a of the punch 71 and the forming surface 73a of the die 73 so that an enlarged, diameter portion 61' is formed as illustrated in FIG. 7. The positional dimension L1 of the workpiece receiving surface 74a of the knockout pin 74 when the lower base 72 advances upward to reach the forward end is secured. Thus, an entire length dimension of a semi-finished member B' subjected to forging is stabilized.

Next, the second step of the primary forging step is described with reference to FIG. 8 and FIG. 9. A mold for use in the second step differs from the first step only in a punch. The first step and the second step are performed using, for example, one piece of the pressing equipment. As illustrated in FIG. 8, a punch 75 for use in the second step comprises a forming surface 75a configured to form the large diameter portion 61a and the recessed portion 61d of the enlarged diameter portion 61 of the semi-finished member 13a' illustrated in FIG. 3. After the first step illustrated in FIG. 7 is performed, when the lower base 72 retreats to a halfway position illustrated in FIG. 8, the punch 71 for use in the first step is slid and moved sideways, and the punch 75 for use in the second step is slid and moved sideways to be arranged at the position illustrated in FIG. 8.

After that, the lower base 72 is driven to advance upward. Then, the guide portion 73c of the die 73 is fitted and inserted into a guide portion 75b of the punch 75, and the semi-finished member B' receives pressure applied by the punch 75 under a state in which the punch 75 and the die 73 are aligned with each other. Similarly to the first step, when the lower base 72 further advances, the knockout pin 74 retreats downward due to the pressure applied by the punch 75. However, the downward retreat, amount of the knockout pin 74 in the lower base 72 is regulated by the stopper (not shown). Accordingly, as illustrated in FIG. 9, the semi-finished member B' fills the forming surface 75a of the punch 73 so that a semi-finished member B" is obtained.

In the second step, the large diameter portion 61a and the recessed portion 61d of the enlarged diameter portion 61 illustrated in FIG. 3 are formed. In combination with the middle diameter portion 61b and a small diameter portion 61c formed in the first step, forming of the enlarged diameter portion 61 on the joining side is completed in the primary forging step. The mold for the first step and the mold for the second, step are operated continuously. After that, the lower base 72 retreats downward, and the semi-finished member B" is discharged by the knockout pin 74.

Next, with reference to FIG. 10 to FIG. 12, description is made of the secondary forging step of forming the remainder of the enlarged diameter portions, which is a principal feature of this embodiment. As illustrated in FIG. 10, a main mold for use in the secondary forging step comprises an upper base 80, a punch 81, a closing ring 85, a closing-ring pressure mechanism 86, a lower base 82, split dies 83, and a knockout pin 84. A forming surface 81a having a tapered shape is formed in the punch 81, and the punch 81 is mounted and fixed to the upper base 80 that is immovable in the up-and-down direction. The closing ring 85 is arranged below the punch 81, and a radially inner surface 85a having a tapered shape is formed in the closing ring 85. The closing ring 85 is mounted to the upper base 80 through intermediation of the closing-ring pressure mechanism 86.

The split dies 83 have a structure of being split into two parts in a diameter direction. However, the split number is not limited thereto, and the split number may be three or more as appropriate. In each of the split dies 83, there are formed a forming surface 83a on an inner side of each of the split dies 83, a radially inner surface 83b configured to accommodate the shaft section 60 of the semi-finished member B" therein and to cramp the shaft section 60 in the radial direction, and a large diameter stepped portion 83c configured, to accommodate the enlarged diameter portion 61 therein. The split dies 83 are mounted to the lower base 82 so as to be relatively movable sideways, and the split dies 83 can be opened and closed by a suitable driving device (not shown) such as an air cylinder. A radially outer surface 83d having a tapered shape is formed on an upper portion of each of the split dies 83. The radially outer surfaces 83d are fitted to the radially inner surface 85a, which has a tapered shape, of the closing ring 85.

The lower base 82 is driven in the up-and-down direction. A guide hole 82a is formed in the lower base 82, and the knockout pin 84 serving as a workpiece receiving member is fitted and inserted in the guide hole 82a so as to be freely slidable. A downward retreat amount of the knockout pin 84 in the lower base 82 is regulated by a stopper (not shown). As illustrated in FIG. 12, a positional dimension L2 of a workpiece receiving surface 84a of the knockout pin 84 when the lower base 82 advances upward to reach a forward end is secured by the equipment or a mold dimension. Therefore, the entire length dimension of the semi-finished member subjected to forging is stabilized. Thus, the machining allowance for the post-processing can be reduced.

Action of the secondary forging step is described with reference to FIG. 10 to FIG. 12. Similarly to the primary forging step, a portion of the semi-finished member B" to be formed, which is opposite to the enlarged diameter portion 61 of the semi-finished member B" formed in the primary forging step, is heated to approximately 800° C. to 1,000° C. As illustrated in FIG. 10, the lower base 82 retreats downward, and the split dies 83 are in an open state. The semi-finished member B" is gripped by a loader (not shown), and the semi-finished member B" is placed on the workpiece receiving surface 84a of the knockout pin 84 under a state in which the enlarged diameter portion 61 of the semi-finished member B" faces downward. The split dies 83 are in an open state. Accordingly, without interfering with the radially inner surfaces 83b of the split dies 83, the enlarged diameter portion 61 of the semi-finished member B" can be placed on the workpiece receiving surface 84a.

Figure 14:
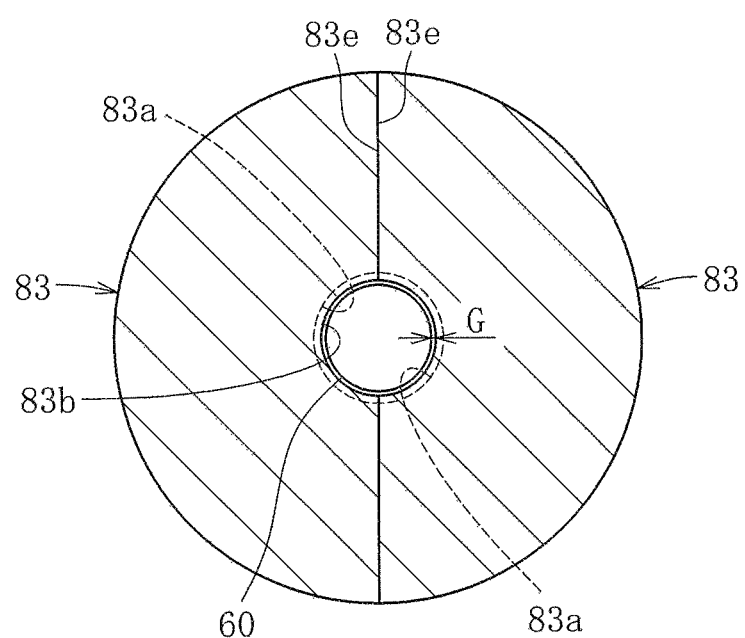
FIG. 14 is a cross-sectional view taken along the line XIV-XIV of FIG. 11.

After that, as illustrated in FIG. 11, the split dies 83 are closed by the suitable driving device (not shown) such as the air cylinder. At this time, mating surfaces 83e and 83e of the two split dies 83 and 83 (see FIG. 10) are brought into abutment against each other so that a shape like a minute line may appear in a joining portion between the two forming surfaces 83a and 83a. Further, as illustrated in FIG. 14, a gap G between an inner diameter formed by the two radially inner surfaces 83b and 83b, and the outer diameter of the shaft section of the semi-finished member B" is extremely small. Accordingly, a billet B" can be cramped in the radial direction with high accuracy.

Subsequently, the lower base 82 is driven to advance upward. The tapered radially outer surfaces 83d of the split dies 83 are fitted to the tapered radially inner surface 85a of the closing ring 85, and the closing ring 85 and the closing-ring pressure mechanism 86 apply a force of closing the split dies 83. Under a state in which the closing force is applied, the lower base 82 continues to move upward together with the closing ring 85 and the split dies 83.

As described above, the positional dimension L2 (see FIG. 12) of the workpiece receiving surface 84a of the knockout pin 84 when the lower base 82 advances upward to reach the forward end is secured. Accordingly, when the lower base 82 continues to move upward, the knockout pin 84 in the lower base 82 is regulated by the stopper (not shown), and the forming surface 81a of the punch 81 starts forming an upper end portion of the semi-finished member B". At the same time, the forming surfaces 83a of the split dies 83 start forming. Then, as illustrated in FIG. 12, when the lower base 82 reaches the forward end of upward movement, a material is filled in a cavity defined by the forming surface 81a of the punch 81 and the forming surfaces 83a of the split dies 83. In this manner, forming of the enlarged diameter portion 62 is completed. The above-mentioned operations of the mold are continuously performed.

In this embodiment, the split dies 83 are closed, and the closing ring 85 and the closing-ring pressure mechanism 86 apply pressure to the outer diameters of the split dies 83. In this manner, the mating surfaces 83e and 83e of the two split dies 83 and 83 are brought into close contact with each other so that a minute linear gap is defined in the joining portion between the two forming surfaces 83a and 83a. The gap is extremely small. Accordingly, the material can be prevented from flowing into the gap during formation. Further, merely a minute linear impression may be formed in the enlarged diameter portion 62 formed in the secondary forging step, which is the remainder of enlarged diameter portions. Accordingly, burr removal processing to be performed as a post-processing step can be eliminated or reduced.

Further, during formation, the knockout pin 84 being the workpiece receiving member receives a reaction force of the punch 81, and a positional relationship of the knockout pin 84 with the split dies 83 is secured. With this configuration, an entire length dimension of a product (semi-finished member 13a') is stabilized. Thus, removal processing to be performed in post-processing can be eliminated or reduced. Further, the product does not have an impression (projecting portion) that may be generated by a clip die of a related-art upset forging machine.

In addition, during formation, both end surfaces of the semi-finished member B" are cramped by the mold (the punch 81 and the knockout pin 84) so that a degree of deformation (such as bend) of the product (semi-finished member 13a') is small. Accordingly, removal processing or leveling to be performed in a post-processing step can be eliminated or reduced.

The product can be formed using the equipment equivalent to a press, and hence inexpensive equipment can be selected. In this embodiment, as the pressing equipment, the general-purpose screw press being a mechanical press is applied by way of example. However, the present invention is not limited thereto. It is only necessary that the mold can be operated to form an enlarged diameter portion using general-purpose pressing equipment or equipment capable of operating equivalent to the general-purpose pressing equipment. A mechanical press such as a connecting rod press, or a non-mechanical press such as a hydraulic press may be used.

In this embodiment, description is made of the example in which the punch 81 is mounted to the upper base 80 and the split dies 83 are mounted to the lower base 82. However, conversely, the punch 81 may be mounted to the lower base 82, and the split dies 83 may be mounted to the upper base 80. Further, the knockout pin 84 being the workpiece receiving member may be arranged, on the punch side.

In this embodiment, description is made of the example in which the closing ring 85 and the dosing-ring pressure mechanism 86 are arranged on the punch 81 side. However, conversely, the closing ring 85 and the closing-ring pressure mechanism 86 may be arranged on the split dies 83 side.

In this embodiment, there is exemplified the shaft member 13a' comprising the two enlarged diameter portions 61 and 62 formed at both ends of the shaft section 60, respectively, but the present invention is not limited thereto. The present Invention is also applicable to a shaft member comprising three or more enlarged diameter portions. For example, one enlarged diameter portion can be formed in the primary forging step, and two enlarged diameter portions can be formed in the secondary forging step by one step or two steps. In this case, in this specification and the scope of claims, the above-mentioned one enlarged diameter portion means the at least one of the enlarged diameter portions, and the above-mentioned two enlarged diameter portions mean the remainder of the enlarged diameter portions.

The present invention is not limited to the above-mentioned embodiment. As a matter of course, various modifications can be made thereto without departing from the gist of the present invention. The scope of the present invention is defined in Claims, and encompasses equivalents described in Claims and all changes within the scope of claims.

DESCRIPTION OF REFERENCE SIGNS 1 drive shaft
2 intermediate shaft
4 boot
5 boot
6 support bearing
10 plunging type constant velocity universal joint
11 outer joint member
12 cup section
12a cup member
12a1 cylindrical portion
12a2 bottom portion
13 long shaft section
13a shaft member
13a' semi-finished member
14 bearing mounting surface
16 inner joint member
20 fixed type constant velocity universal joint
21 outer joint member
22 inner joint member
23 torque transmitting element (ball)
24 cage
30 track groove
40 track groove
41 torque transmitting element (ball)
42 cylindrical inner peripheral surface
49 welded portion
50 joining end surface
54 joining end surface
60 shaft section
61 enlarged diameter portion
62 enlarged diameter portion
70 upper base
71 punch
71a forming surface
72 lower base
73 die
73a forming surface
74 workpiece receiving member (knockout pin)
75 punch
75a forming surface
80 upper base
81 punch
81a forming surface
82 lower base 83 split die
83a forming surface
83b radially inner surface
84 workpiece receiving member (knockout pin)
85 closing ring
86 closing-ring pressure mechanism

The invention claimed is:

1. A forging method for a semi-finished member for a shaft member of a constant velocity universal joint, the forging method comprising:
    preforming at least one of a plurality of enlarged diameter portions on a shaft section to obtain the semi-finished member, the preformed at least one of the enlarged diameter portions being at a joining side, at which a large diameter portion and a recessed portion are formed; and
    forming a remainder of the enlarged diameter portions of the semi-finished member using a mold,
    the mold comprising:
        a punch;
        split dies, which have large diameter stepped portions configured to accommodate the preformed at least one of the enlarged diameter portions of the semi-finished member therein and radially inner surfaces configured to accommodate and to confine in a radial direction the shaft section of the semi-finished member therein, each of the split dies comprising a forming surface to form the remainder of the enlarged diameter portions; and
        a workpiece receiving member, which is configured to allow the preformed at least one of the enlarged diameter portions of the semi-finished member to be placed thereon, and receive pressure applied by the punch,
    wherein the forming of the remainder of the enlarged diameter portions comprises:
        placing the semi-finished member having the preformed at least one of the enlarged diameter portions on the workpiece receiving member;
        confining the shaft section of the semi-finished member by closing the split dies and bringing mating surfaces of the split dies into abutment with each other such that when the mating surfaces of the split dies are in abutment, a small gap is present between the shaft section and the radially inner surfaces of the split dies in the radial direction of the shaft section and the semi-finished member is movable in an axial direction with respect to the split dies; and
        applying pressure with the punch to the semi-finished member under a state in which the semi-finished member is confined, wherein the applying pressure fills the semi-finished member into the forming surfaces of the split dies,
        during the applying pressure, retreating the workpiece receiving member a retreat distance, wherein the retreat distance is regulated by a stopper.

2. The forging method according to claim 1, wherein the mold further comprises a closing ring configured to apply a force of closing the split dies.

3. The forging method according to claim 2, wherein pressure is applied to the closing ring by a closing-ring pressure mechanism.

4. The forging method according to claim 2, wherein the semi-finished member is heated to 800° C. to 1,000° C.

5. The forging method according to claim 2, wherein a minute linear impression is formed in the remainder of the enlarged diameter portions.

6. The forging method according to claim 2, wherein the shaft member comprises the enlarged diameter portions at both ends of the shaft section.

7. The forging method according to claim 2, wherein the shaft member of the constant velocity universal joint comprises a long stem member of an outer joint member.

8. The forging method according to claim 1, wherein the punch comprises a forming surface.

9. The forging method according to claim 1, wherein the semi-finished member is heated to 800° C. to 1,000° C.

10. The forging method according to claim 1, wherein a minute linear impression is formed in the remainder of the enlarged diameter portions.

11. The forging method according to claim 1, wherein the shaft member comprises the enlarged diameter portions at both ends of the shaft section.

12. The forging method according to claim 1, wherein the shaft member of the constant velocity universal joint comprises a long stem member of an outer joint member.

13. The forging method according to claim 1, wherein the recessed portion is formed in a surface of the semi-finished member that is perpendicular to a central axis of the semi-finished member.

* * * * *